United States Patent [19]

Tendick et al.

[11] Patent Number: 4,458,380
[45] Date of Patent: Jul. 10, 1984

[54] ON LINE AUTOMATIC POULTRY SHAPER

[75] Inventors: Edwin W. Tendick, Greer; Joseph E. Owensby, Spartanburg, both of S.C.

[73] Assignee: W. R. Grace & Co., Cryovac Div., Duncan, S.C.

[21] Appl. No.: 401,273

[22] Filed: Jul. 23, 1982

[51] Int. Cl.³ .................. A22C 21/00; B65B 43/26
[52] U.S. Cl. ............................. 17/11; 53/113; 53/529
[58] Field of Search ............ 53/529, 113; 17/11, 17/1 R

[56] References Cited

U.S. PATENT DOCUMENTS

| | | | |
|---|---|---|---|
| 3,817,167 | 6/1974 | Mosterd | 17/11 X |
| 4,121,321 | 10/1978 | Mosterd | 17/11 |
| 4,147,012 | 4/1979 | van Mil | 53/572 X |
| 4,257,141 | 3/1981 | van Brummelen | 17/11 |
| 4,377,929 | 3/1983 | Altenpohl et al. | 53/572 |

Primary Examiner—Willie G. Abercrombie
Attorney, Agent, or Firm—John J. Toney; William D. Lee, Jr.; Joseph P. Harps

[57] ABSTRACT

When hanging from a conveyor line, cleaned eviscerated, whole poultry is stiff and in a "rigor mortis" type condition. This condition makes it very difficult to compress the stretched-out, stiff bird into a compact, plumb-appearing shape so that it can be readily placed into a bag for further packaging. Disclosed herein is a method and apparatus in which a cam actuated tray picks up the bird while it is hanging from shackles, and pushes the bird towards its legs so that the legs are forcibly flexed and the stiffened condition is overcome. Once this initial flexing takes place the legs can easily be repositioned either manually or on most automatic loading equipment.

4 Claims, 5 Drawing Figures

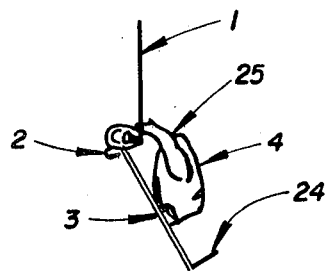
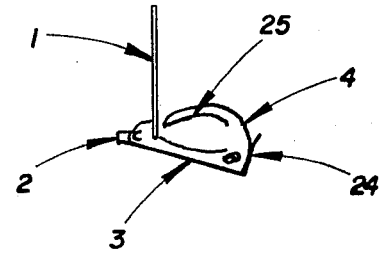
FIG. I(A)          FIG. I(B)
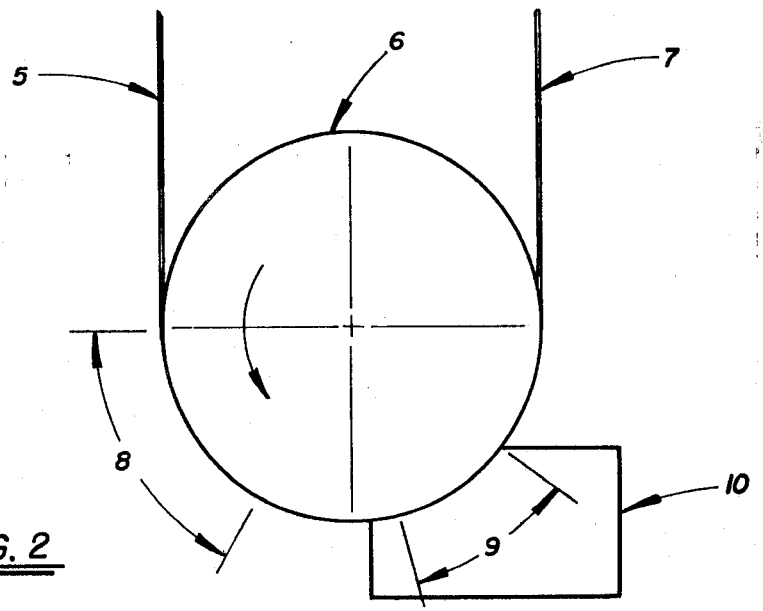
FIG. 2
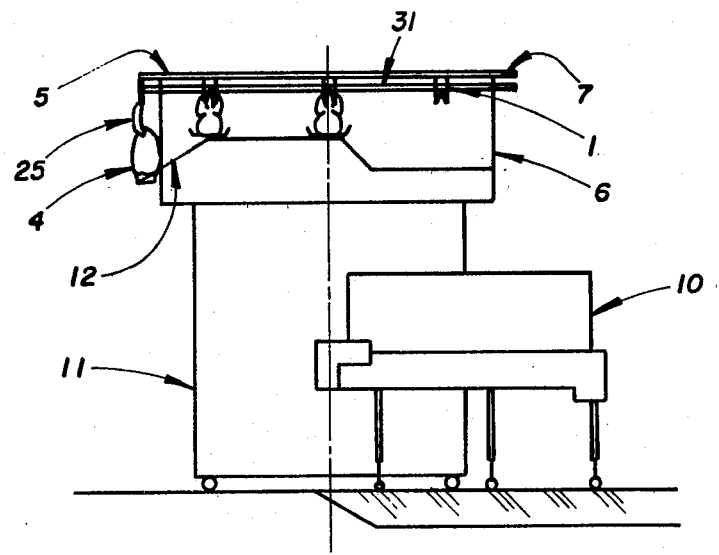
FIG. 3

ON LINE AUTOMATIC POULTRY SHAPER

FIELD OF THE INVENTION

This invention relates to the automatic packaging of poultry products and particularly to a method and apparatus for flexing the stiffened bird before it is packaged in order to facilitate both manual and machine packaging.

BACKGROUND OF THE INVENTION

In a typical poultry slaughtering and packaging operation, the birds are slaughtered, cleaned, eviscerated, washed and chilled in water and then hung by the hocks of the legs on shackles and conveyed to a packaging area. The typical bird as it hangs from its legs in the chilled condition becomes quite stiff and develops rigor mortis or a condition quite similar to it. In this condition, the bird is stretched-out and looks rather "skinny" and not appealing to a consumer. To compress the bird by bringing the legs and body into closer contact and, consequently, into a more appealing shape, requires significant manual effort and is not convenient or easy to do.

Accordingly, it is one object of the present invention to provide a method and apparatus for flexing the legs of stiff, cleaned, eviscerated poultry so that the legs may be readily re-flexed.

It is another object of the present invention to provide an automatic apparatus and method so that the legs of whole, stiffened, eviscerated birds may be flexed and placed in a condition so they may be re-flexed for manual and automatic packaging.

In U.S. Pat. No. 3,091,904 which issued on June 4, 1963 to M. A. Howe, Jr. et. al. an apparatus for plumping and applying a wrapper to poultry is described. This apparatus is a horizontal vice-like device in which the poultry is essentially placed in what could be termed the "jaws" of the vice along with wrapping material and as the jaws close the poultry and wrapping material are compressed and the poultry is "plumped". However, this device is not readily adaptable to continuous in-line processing of poultry. Accordingly, it is another object of the present invention to provide an apparatus which is readily adaptable to continuous on-line processing of poultry.

In German Patent Office Publication No. DE OS 2244103 which was filed on Sept. 8, 1972 under Application No. P22 44 103.8 by Jacob Hendrik Mosterd and which is entitled "Apparatus For Shaping Poultry", an apparatus for shaping slaughtered birds in-line is described that includes a pressure plate for shaping the chicken and includes a relatively complex mechanism to achieve the shaping of the poultry. Accordingly, it is another object of the present invention to provide an apparatus in which the number of parts and mechanism required is reduced so that ease of operation and maintenance is achieved.

In U.S. Pat. No. 4,270,336 which issued on June 2, 1981 to William F. Altenpohl, et. al. a device is described which processes poultry releasably suspended from a conveyor and the poultry is forced into a bag after being released from the conveyor by passing through what appears to be loading "shoes" which act like movable shoehorns in guiding and shaping the poultry as it is placed into a bag. It is yet another object of the present invention to provide a shaping device for poultry which is adaptable to both manual or automatic bag loaders.

The foregoing objects and advantages of the present invention will become more apparent with reference to the following Summary of the Invention, Description of the Drawings, and Detailed Description.

SUMMARY OF THE INVENTION

In one aspect, the subject invention is an apparatus for flexing the legs of whole poultry or birds that have become stiffened by chilling after slaughter so that the bird may be properly shaped as it is further packaged or placed into a recpticle such as a bag. The apparatus includes means for supporting the bird by the lower portion of its legs so that the bird hangs downwardly and the legs are restrained from movement in the direction of the body of the bird; tray means mounted for engaging and lifting the body of the bird towards its legs thereby flexing the legs of said bird and shaping the bird for packaging; and, means for lifting said tray to engage and lift said bird. The foregoing described apparatus may also include means for moving the bird while suspended in shackles on a conveyor so that its movement is synchronized with that of the tray means thereby accomplishing in-line shaping and flexing of the poultry.

In another aspect, the present invention is a method for continuously flexing the legs of stiffened poultry which is hanging from shackles on a conveyor supported by the hocks of its legs by restraining the movement of the legs of the poultry, engaging the poultry with tray means and lifting the body portion of the poultry towards its legs thereby flexing the legs and thereafter releasing the tray means from engagement with the body of the poultry so that thereafter the poultry may be readily flexed and shaped as it is further packaged or bagged.

DESCRIPTION OF THE DRAWINGS

In the drawings which are appended hereto and made a part of this disclosure:

FIG. 1 is a schematic representation showing the bird in FIG. 1 (A) before it is compressed by the tray means and showing in FIG. 1 (B) the bird as it is compressed by the tray means;

FIG. 2 is a top plan view of a continuous, in-line processing apparatus showing the incoming conveyor, shaping area, discharge area, and the outgoing conveyor, the conveyor means being driven by the turret whose top is seen;

FIG. 3 is a side elevation view of the apparatus shown in FIG. 2 further showing the birds arriving on shackles and being compressed by the tray means.

DETAILED DESCRIPTION

Figure 4:
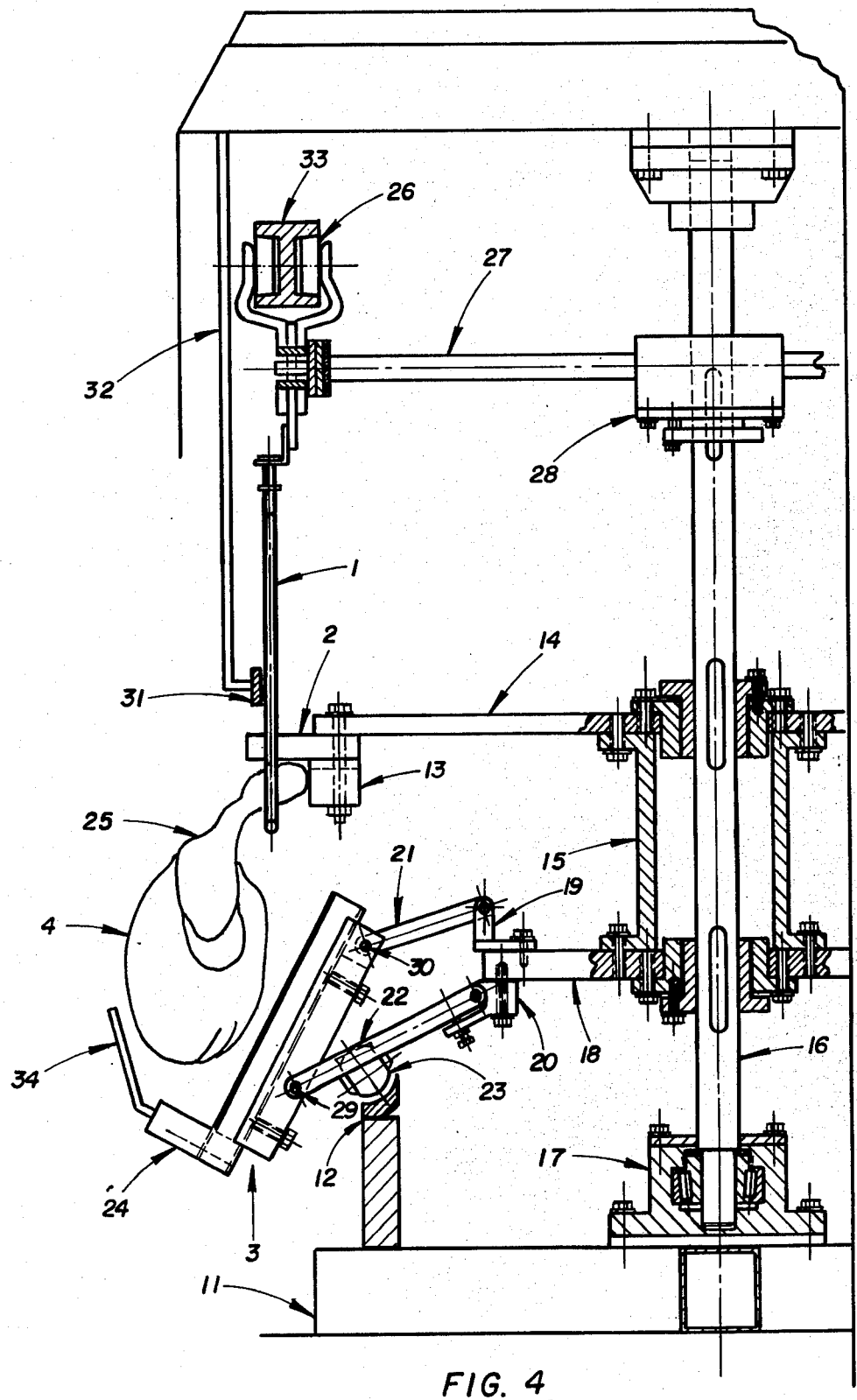
FIG. 4 is a partial section in elevation through the turret assembly showing the lifting mechanism for the tray means and the shackle and leg restraining means for the bird.

Looking first at FIGS. 2 and 3 poultry products 4 arrive at turret assembly 6 carried by shackles 1 which are suspended from incoming conveyor 5 and are preferably spaced an equal distance apart. The shackles are provided with two loops which will receive the bird's legs and hold it in a downwardly hanging position. As they arrive at turret 6 they pass through the hock or leg compressing area 8 and then move to discharge area 9 where the birds are placed in bin 10 for automatic loading as they are removed from the shackles. The empty shackle is then moved out of the turret area and by outgoing conveyor 7. Turret 6 is supported by stationary support 11 which does not rotate. Also supported by support 11 is the cam surface 12 which does not rotate.

Turning now to FIG. 4, shackle 1 is shown in contact with shackle locator arm 27 and the shackle is suspended from roller conveyor assembly 26 carried by "I" beam econveyor rail 33. A bird 4 is shown hanging from its legs 25 and the lower portion of each of the legs 25 is fastened or wedged into shackle 1 which has the spaced apart leg receiving loops which can be better seen in FIG. 3. Still referring now to FIG. 4, the lower portion of leg 25 is restrained from movement away from the bird's body by leg restrainer 13 which is kept in correct position by shackle locator 2 which is carried by support 14 and, along with upper shackle support and locator arm 27, synchronously engages each shackle as it arrives on the incoming portion of the conveyor 5. Shackle retainer 31 which is carried by support 32 prevents shackle 1 from moving outwardly away from the center of turret 6. Body retainer 34 which is attached to tray end wall 24 aids in further positioning and securing bird 4. Below support arm 14 is found tray support arm 18 which carriers upper pivot arm support 19 and lower pivot arm support 20 to which upper support arm 21 and lower pivot arm 22 are respectively connected. Arms 21 and 22 are connected pivotally to tray 3 which is provided with tray end wall 24. On the underside of pivot arm 22 is a cam follower which is preferably a ball mounted to roll in the cam surface 12.

Still referring to FIG. 4, bearing assembly 17 is supported by turret support 11. Journalled in bearing support 17 is the end of turrent drive shaft 16 which carries drive shaft mounting housing 15 to which tray support arm 18 and shackle locator support arm 14 are attached. Spaced apart and above housing 15 on shaft 16 is a second support drive and housing 28 from which shackle support arm 27 extends. Arms 27, 14, 18 all turn with drive shaft 16 and are in the same vertical plane. A multiplicity of trays, shackles, and support arms of like configuration are spaced at equal intervals around the drive shaft carried by the mounting and support housings. The radial spacing between arms 27, 14 and 18 is determined by the spacing of the shackles as they are located on the conveyor 5 so as the arms rotate they mesh and synchronously meet the shackles in the same manner as the teeth in a sprocket on a bicycle mesh with the chain.

In operation as a bird comes into the compressing or flexing area 8 as shown in FIG. 2, the follower 23 on corresponding tray 3 engages the inclined cam surface 12 as shown in FIG. 3. Referring again to FIG. 4 as the inclination of the cam surface 12 increases the cam follower 23 which is riding along the surface 12 forces pivot arm 22 to move upwardly and the upper pivot arm 22 provides an additional pivot point around which the tray swivels as it is raised upwardly. In other words, as pivot arm 22 lifts the central portion of the tray the action through the tray pivot 30 is to restrain and stabilize upward movement of the upper portion of the tray and to provide a point about which the tray rotates as it is further lifted by pivot arm 22 acting through the central pivot 29. In FIG. 4 the tray is essentially in the same position as shown in FIG. 1 (A). At the point at which the cam surface 12 reaches its highest point as shown in FIG. 3 the bird is compressed by the pivoted swivel or rotation of the tray 3 as it is held by end wall 24 and retainer 34 as shown in FIG. 1 (B). Since the leg 25 is restrained from motion by leg restrainer 13 and by locator 2 the body of the bird is forced towards the leg and the legs are forcibly flexed and the stiffness of the legs are overcome, thus, the bird is compressed into the "plump" configuration as shown in FIG. 1 (B). This "flexing" or "breaking" action permanently overcomes the stiffness of the legs or hocks of the bird and after this has been accomplished the tray is returned to its original position as the cam follower moves along the new descending cam surface. (See FIG. 3) The bird can be released from the shackles either manually or by a mechanical release at this point and placed in collecting bin 10 for further packaging and wrapping. The bird can now be "plumped" readily by hand or by automatic means.

Having thus described our invention,

We claim:

1. Apparatus for flexing the legs of whole poultry or birds that have become stiffened after slaughter thereby placing the bird in condition where it may be readily shaped for further processing and packaging comprising:
   (a) shackle means for holding the bird by the lower portion of its legs so that the bird's body hangs downwardly;
   (b) shackle locator and leg restrainer means to prevent movement of the birds legs away from the body of the bird;
   (c) tray means for engaging and lifting said bird;
   (d) cam means for lifting said tray means;
   (e) pivot meants to swivel or rotate said tray as it lifts and engages said bird; and
   (f) means for moving said cam means so that the cam means will lift said tray.

2. The apparatus of claim 1 including a plurality of the means (a) through (f).

3. The apparatus of claim 2 including conveyor means to which shackle means are operably connected so that said apparatus may operate in a continuous manner.

4. Apparatus for flexing the legs of a whole poultry or birds that have become stiffened after slaughter thereby placing the bird in condition where it may be readily shaped for further processing or packaging comprising:
   (a) a conveyor;
   (b) a plurality of shackles disposed at equally spaced apart distances on said conveyor, said shackles being provided with two loops which will engage and support a bird in a downwardly hanging fashion when its legs are supported within said loops;
   (c) a rotatable turret and means to drive same in a rotating manner and move said conveyor;
   (d) shackle locator and drive means located on said turret to synchronously engage the shackles on said conveyor;
   (e) leg restraining means associated with each shackle;
   (f) pivotedly mounted tray means carried by upper and lower pivot arms which are attached to said turret through a tray support arm to rotate therewith;
   (g) a fixed cam surface;
   (h) a cam follower mounted to ride on said cam surface, said cam follower being attached to the lower of said pivot arms so that the tray will be lifted by an increase in the height of said cam surface as the tray is moved around the turret whereby when said tray is lifted it will engage and lift the bird so that the body of the bird moves while the legs are restrained thus permanently flexing the legs of the bird.

* * * * *